United States Patent Office 2,703,801
Patented Mar. 8, 1955

2,703,801
FLUORESCENT AGENTS

Bernard W. Rottschaefer, East Greenbush, and Arnold F. Pine, Albany, N. Y., assignors to General Aniline & Film Corporation, New York, N. Y., a corporation of Delaware No Drawing. Application February 3, 1951,
Serial No. 209,320

4 Claims. (Cl. 260—247.1)

This invention relates to fluorescent agents derived from diaminostilbenesulfonic or carboxylic acids which are of particular value as optical bleaching agents, especially for the brightening of textile materials by treating the textiles with a bath of these agents or by washing the textiles in baths containing soaps and other detergents to which a small amount of these fluorescent agents have been added.

The novel fluorescent agents of the present invention may be represented by the following general formula

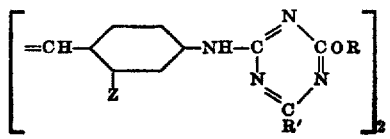

Formula I wherein Z represents a sulfonic or carboxylic acid group or salt thereof and R represents an alkyl or aryl group and R' represents the residue of a primary or secondary amine or the residue of an alcohol or phenol.

These novel compounds may be prepared by reacting a 4,4'diaminostilbenesulfonic or carboxylic acid, usually 4,4'diaminostilbene 2,2'disulfonic acid with cyanuric chloride followed by the reaction of the thus formed triazyl derivative with two molar equivalent amounts of a phenol or alcohol followed by reaction of the thus formed ether with two molar equivalent amounts of the same or different alcohol, or phenol or a primary or secondary amino compound. While the novel compounds of the present invention may be obtained by reacting the triazyl intermediate with two molecular proportions each of an amine and a phenol in any order, it has been found desirable if both an amine and a phenol are to be condensed with the triazyl intermediate to first condense the phenol with the triazyl intermediate and then condense the amine with it since products of higher purity seem to be obtained in this manner.

These reactions may be carried out by procedures commonly employed in the art for effecting such reactions. In order to fully illustrate the preparation of the compounds of the present invention, the following detailed illustrations of the preparation of typical compounds embraced within the scope of the present invention are given. In these examples the parts are by weight.

IN PREPARATION OF TRIAZYL INTERMEDIATE

Example A 44.4 parts cyanuric chloride are dissolved in approximately 230 parts acetone. This solution is then poured quickly into about 600 parts ice and water in order to precipitate the cyanuric chloride in fine form.

To this is added a solution containing 44.4 parts diaminostilbene-disulfonic acid in approximately 400 parts water and sufficient sodium carbonate to neutralize the sulfonic groups.

The reaction is maintained neutral to Congo red by addition of an alkaline agent and is maintained at a temperature lower than 5° C. until no more diaminostilbenedisulfonic acid is present as determined by a tetrazotization and coupling test.

There is thus obtained a solution or a suspension of [2,4-dichloro 1,3,5 triazyl (6)]diaminostilbenedisulfonic acid sodium salt of the formula:

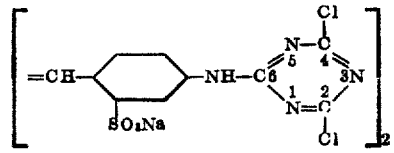

Formula II

The novel fluorescent agents of the present invention may then be prepared from this intermediate as illustrated in the following examples. In each of these examples the triazyl intermediate employed was prepared as described above and was used without further purification or treatment.

Example 1

To the triazyl intermediate of Formula II above, prepared as described in Example A, there is added a solution of 22.5 parts phenol in 100 parts water and approximately 25 parts 40% NaOH is added. After several hours of stirring at 5–10° C. and several more hours at room temperature, 29 parts morpholine are added and the reaction mass stirred several hours at 60–70° C., the reaction being maintained alkaline by addition of sodium carbonate. The product is cooled to room temperature, filtered and dried. The product has the formula:

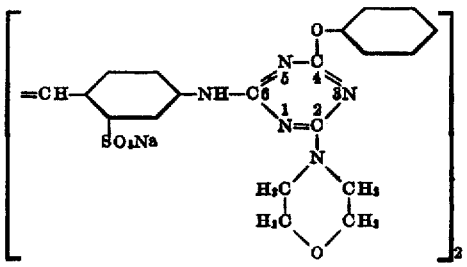

The product obtained fluoresces with a very strong bright bluish color, is substantive to cotton, and gives a bright, white color when applied to fabrics. It can be applied to the fiber directly or in a detergent composition. It does not have high build up properties and therefore repeated washings with this as a brightening agent additive to detergents does not result in undue brightness. Nor does the fabric become discolored due to deterioration of the brightening agent:

Example 2

To the triazyl intermediate prepared as described in Example A above, 29.4 parts p-anisidine stirred up well in 100 parts water plus sufficient hydrochloric acid to dissolve the mass are then added. Sufficient alkali (30% NaOH solution) is added to maintain Congo neutrality while the temperature is allowed to rise to room temperature. When the anisidine has reacted as indicated by a negative diazotization and coupling test, 22.5 parts phenol in 100 parts water and 25 parts 40% NaOH are added. The reaction mixture is heated to and maintained at 60–70° for several hours during which time alkalinity is maintained. The charge is cooled to room temperature, filtered and dried. The thus obtained product has the formula:

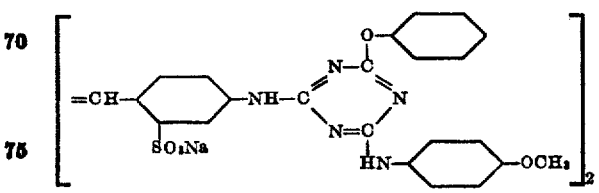

This product also fluoresces in a very strong bright bluish color, is substantive to cotton when applied to fabrics either directly or in detergent compositions. It was found to have satisfactory build-up properties and fabrics treated therewith did not become discolored due to deterioration of the brightening compound.

Example 3

To the triazyl intermediate prepared as described in Example A above, 45 parts phenol, 200 parts water and 50 parts 40% NaOH are added. The temperature is maintained at 5–10° C. for several hours, then gradually raised to 60–70° C. for several hours, an alkaline medium being maintained by continued addition of caustic. The product is cooled to room temperature, filtered and dried. This product had the formula:

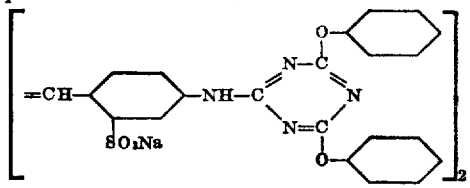

and was similar to the products of Examples 1 and 2 above.

Example 4

To the triazyl intermediate prepared as described in Example A above, there is added 26.4 parts of hydroquinonemonomethyl ether and immediately afterwards sufficient sodium carbonate solution is added to increase the pH to 6.5. The thus obtained mixture is heated to 35° C. and allowed to stay overnight, keeping the pH at 6.5 by the addition of sodium carbonate solution if necessary. There is then added 30 parts of morpholine and the pH of the solution is increased to 7.5 to 8.0 by the addition of sodium carbonate solution. The thus formed mixtures are heated slightly to 90° C. and maintained for 3 hours. The mixture is then cooled to room temperature and the product recovered by filtration and dried. There is thus obtained a valuable fluorescent agent for incorporation in soaps and other detergents for brightening textiles washed therein having the following formula:

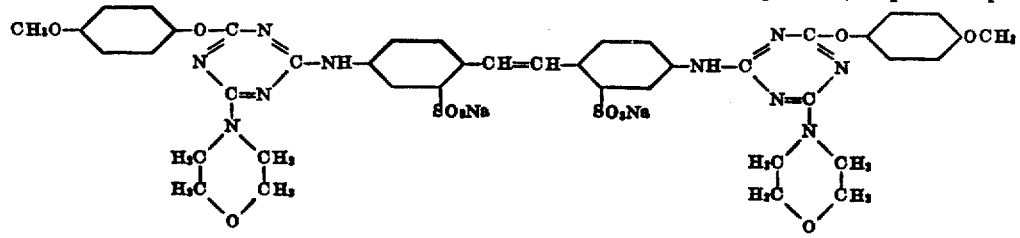

Example 5

To the triazyl intermediate of Formula II above, prepared as described in Example A, there is added a solution of 22.5 parts of phenol and immediately afterwards sufficient sodium carbonate solution is added to increase the pH to 6.5. The thus obtained mixture is heated to 35° C. and allowed to stand overnight, keeping the pH at 6.5 as above. There is then added 24 parts of piperidine and the pH is increased to 7.5 to 8.0 by the addition of sodium carbonate solution and the thus formed mixture is heated to 90° C. and maintained for three hours. The mixture is then cooled and the product isolated by filtration and dried. There is then obtained a novel fluorescent agent which is of value for brightening of textiles and similar material by incorporating a minor amount thereof in soaps and other detergents used for washing the materials. This fluorescent agent has the following formula:

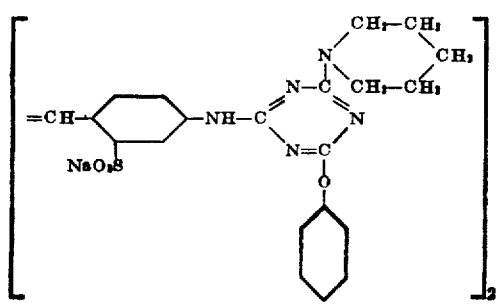

Example 6

To the triazyl intermediate prepared as described in Example A above, there is added 26.4 parts of hydroquinonemonomethyl ether and immediately afterwards sufficient sodium carbonate solution is added to increase the pH to 6.5. The thus obtained mixture is heated to 35° C. and allowed to stand overnight, keeping the pH to 6.5 as above. There is then added 24 parts of piperidine and the pH is increased to 7.5 to 8.0 by the addition of sodium carbonate solution and the mixture slightly heated to 90° C. and maintained at this temperature for three hours. The mixture is then cooled and the product isolated by filtration and dried. There is thus obtained a valuable fluorescent agent which, when incorporated in soap and similar detergents, materially whitens textiles washed therewith. This fluorescent agent has the formula:

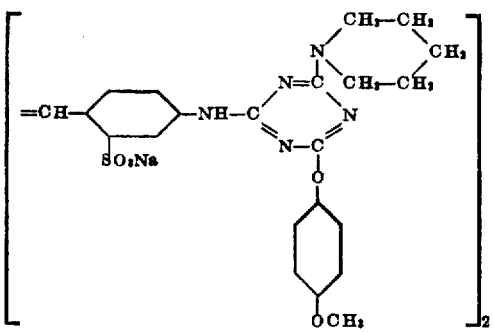

Example 7

To the triazyl intermediate of Formula II above, prepared as described in Example A, there is added a solution of 28 parts of o-cresol in 100 parts water and approximately 25 parts 40% NaOH is added. After several hours of stirring at 5–10° C. and several more hours at room temperature, 29 parts morpholine are added and the reaction mass stirred several hours at 60–70° C., the reaction being maintained alkaline by addition of sodium carbonate. The product is cooled to room temperature, filtered and dried. There is thus obtained a valuable fluorescent agent which, when incorporated in soap and other detergents, materially brightens textiles washed therewith. This fluorescent agent has the formula:

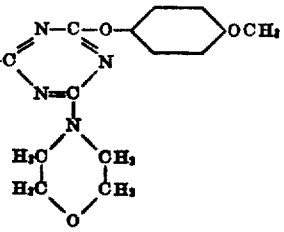

Closely related valuable fluorescent brightening agents of similar properties are obtainable by employing M-cresol or P-cresol in mixtures of isomeric cresols in place of o-cresol in this example.

It will be apparent that the products obtainable by replacing the phenol in any of the foregoing examples with the equivalent amounts of other phenols or alcohols have substantially similar properties and are embraced within the scope of the present invention.

As examples of alcohols or phenols which may be used in place of phenol in the foregoing examples may be mentioned lower aliphatic alcohols, particularly, methyl, ethyl, propyl, isopropyl; butyl-, (n-, sec-, iso-, or tert.) and amyl alcohols. Also simply substituted lower alkyl alcohols such as ethyleneglycol, butanediol, epichlorhydrin and such phenols as chlorophenol or chlorocresols, o, m or p cresols, also resorcinol and lower alkyl (one to four carbon atoms), allyl and propargyl ethers of resorcinol, also phloroglucinol and similar mono- and di-ethers thereof.

It will also be understood that in place of the morpholine or aniline employed as a second substituent on the triazyl ring in Examples 1 and 2 above, other aromatic amines such as primary and secondary amines, either alkyl, dialkyl, mixed alkyl-aryl amines or heterocyclic amines may be employed. As examples thereof, may be mentioned methylamine, ethylamine, dimethylamine, butylamine, aniline, N-methyl aniline, tolylamine, anisidine, naphthylamine, acetamide, benzoylamide, morpholine, pyridine, piperidine.

It will be apparent from the above that the phenol or alcohol condensed with the triazyl intermediate should in the case of aliphatic alcohols contain not more than four carbon atoms and in the case of phenols should contain only the phenyl radical. Both the alcohol or phenol employed may be further substituted by alkyl, aryl, alkaryl, alkoxy, aryloxy, halogen, nitro, cyano, carboxylic acid, amido, amino and substituted amino radicals. However, alkyl substitutents of 1-5 carbon atoms or more than one phenyl group in the case of an aryl substituent should be avoided and by "simply substituted" as used in the claims of the present application is meant substituents free of any groups other than those specified above.

It has been found that these novel fluorescent agents of the present invention, which contain on each triazyl group either two phenoxy substituents including lower alkoxy (methoxy substituted phenoxy substituents) or one phenoxy substituent and one heterocyclic amino substituent, are particularly valuable for the brightening of textiles by incorporating them in soaps used for washing textiles.

In addition to the compounds described in the foregoing specific examples, the following compounds are included in the preferred compounds of the present invention.

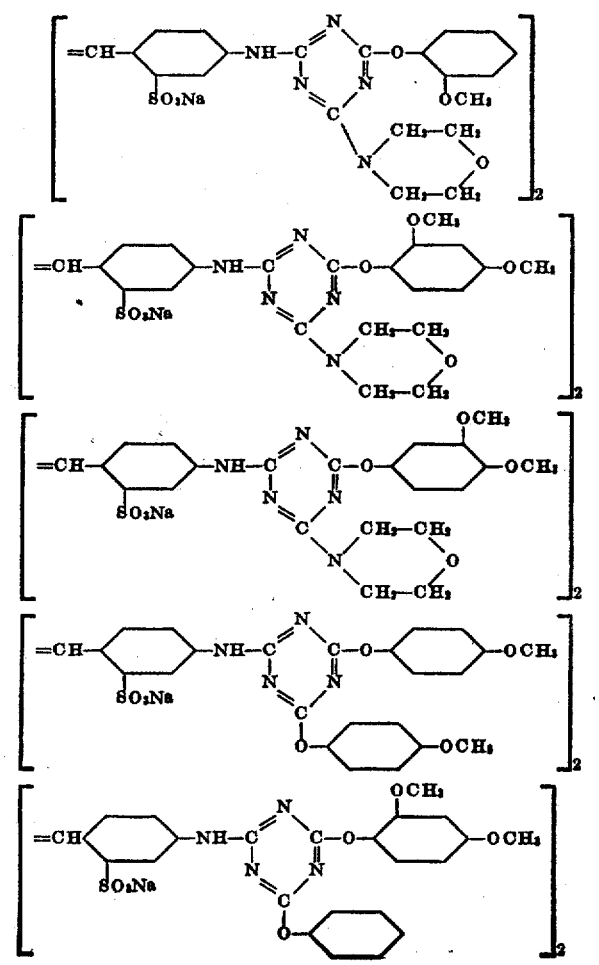

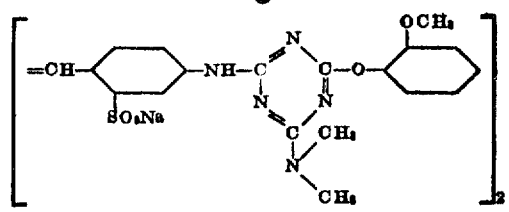

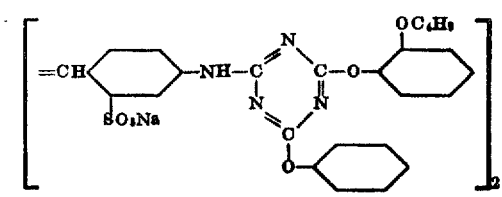

It will also be apparent that while the derivatives of diaminostilbene 2,2' disulfonic acid are commonly employed, other diaminostilbene sulfonic and carboxylic acids may be used, if desired. As examples thereof, may be mentioned, 4,4' diaminostilbene 3,3' disulfonic acid, 4,4' diaminostilbene 2,2'6,6' tetrasulfonic acid, 4,4' diaminostilbene 2,2' dicarboxylic acid or 4,4' diaminostilbene 3,3' dicarboxylic acid. However, 2,2' disulfonic acid is preferred since it is more readily available and has good fluorescence and solubility. Carboxylic acids, it has been found, generally fluoresce with a somewhat weaker shade than the corresponding sulfonic acids.

It will also be apparent that the products, in accordance with the foregoing examples, were obtained in the form of their sodium salts. However, the potassium salts have substantially similar properties and it will be apparent that the potassium salts may be obtained by using potassium carbonate or hydroxide in place of sodium carbonate and hydroxide in the foregoing examples. The free acids may be obtained by acidification of potassium or other salt while other salts such as ammonium or hydroxylamine salts and alkaline earth metal salts and higher alkyl or cycloamine salts may be obtained by neutralization of the free acids. Where spirit soluble products are desired, i. e., in brightening of lacquers, etc. the higher alkyl or cycloamine salts such as cyclohexylamine salts may be produced by methods known in the art.

We claim:
1. Fluorescent agents, which in the form of the free acid have a formula:

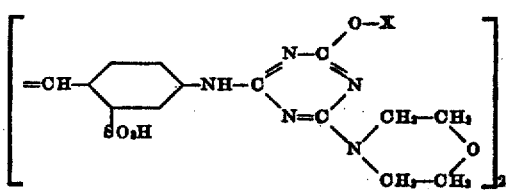

wherein X represents a member of the group consisting of phenyl, anisyl and tolyl.

2. Fluorescent agents which in the form of the free acid have the formula

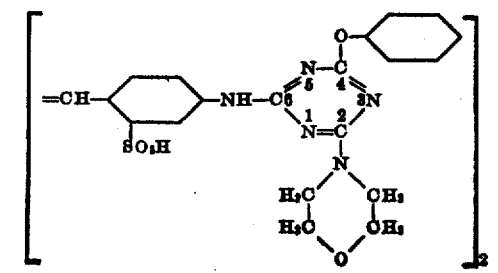

3. Fluorescent agents which in the form of the free acid have the formula
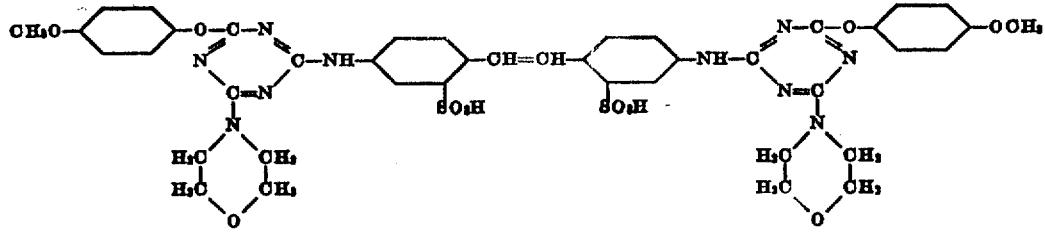
4. Fluorescent agents which in the form of the free acid have the formula:
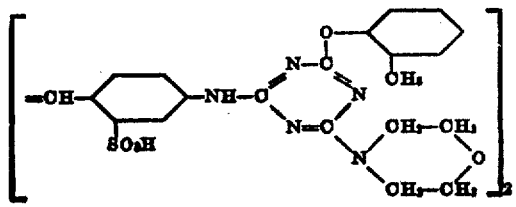
References Cited in the file of this patent
UNITED STATES PATENTS
| | | |
|---|---|---|
| 2,368,844 | Keller et al. | Feb. 6, 1945 |
| 2,376,743 | Wendt | May 22, 1945 |
FOREIGN PATENTS
| | | |
|---|---|---|
| 237,394 | Switzerland | Aug. 1, 1945 |
OTHER REFERENCES
Serial No. 381,856, Wendt (A. P. C.), published August 11, 1943.

Notice of Adverse Decision in Interference

In Interference No. 87,705, involving Patent No. 2,703,801, B. W. Rottschaefer and A. F. Plue, Fluorescent agents, final judgment adverse to the patentees was rendered Apr. 30, 1957, as to claim 2.

[*Official Gazette June 25, 1957.*]